July 29, 1958 A. F. WOODELL 2,845,102
DADO CUTTERS
Filed May 3, 1957

INVENTOR.
ALBERT FRED WOODELL
BY
ATTORNEY

United States Patent Office 2,845,102
Patented July 29, 1958

2,845,102

DADO CUTTERS

Albert Fred Woodell, Dallas, Tex., assignor to Rotex Mfg. Co., Dallas, Tex., a corporation of Texas Application May 3, 1957, Serial No. 656,899

12 Claims. (Cl. 144—235)

This invention relates in general to new and useful improvements in woodworking cutters and, more particularly, to a dado cutter.

Circular woodworking saws are usually provided with an arbor upon which various cutters and attachments can be removably secured. One such attachment used for grooving and rabbeting is known as a dado cutter and includes a specially formed circular blade and a plurality of elongated blades having cutting tips at their opposite ends. The circular blade and elongated blades are mounted on the saw arbor in facewise contiguous relationship, the number of elongated blades used being determined by the width of groove to be cut. While this type of dado cutter can be used with a table saw, it cannot be satisfactorily used on power handsaws, since the cutter assembly frequently has a tendency to jam, causing a dangerous condition which might result in serious injury to the user. Furthermore, with conventional dado heads, the cut is primarily made by the opposed sets of aligned teeth on the elongated cutters, so that, in effect, the groove or rabbet is progressively cut to its final cross-sectional shape during each 180° of rotation of the dado head and, consequently, the cutting impact is primarily directed against the opposed sets of aligned teeth on the elongated cutter. As a result, a rather large amount of power is required to drive the arbor and, even with large power input, the dado head often becomes clogged and inefficient.

It is, therefore, one of the objects of the present invention to provide a one-piece dado cutter particularly suitable for use with power driven handsaws.

It is also an object of the present invention to provide a dado cutter wherein the cutting impact is distributed over a plurality of different teeth.

It is a further object of the present invention to provide a dado cutter of the type stated wherein successive sharpening of the teeth during the effective life of the cutter will not alter the width of cut.

With the above and other objects in view, my invention resides in the novel features of form, construction, arrangement, and combination of parts presently described and pointed out in the claims.

In the accompanying drawings—

Figure 1:
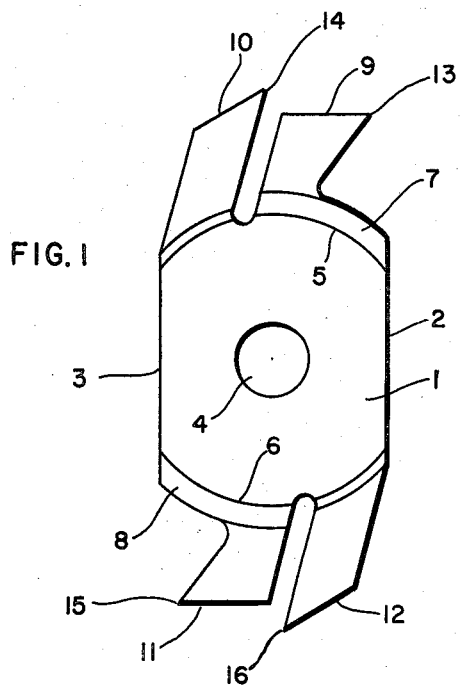
Fig. 1 is a side elevational view of a dado cutter constructed in accordance with and embodying the present invention.

Referring now in more detail and by reference characters to the drawings, which illustrate practical embodiments of the present invention, A designates a dado cutter comprising a strip-like steel disk 1 which may be of any suitable gauge and is formed of any conventional steel alloy ordinarily used for such purposes. The steel disk 1 is provided with opposed straight parallel margins 2, 3, a central arbor hole 4, and diametrally opposed arcuate margins 5, 6, the latter having offset flanges 7, 8 extending angularly outwardly therefrom, which are concentric with the arbor hole 4. Integrally formed on the flanges 7, 8 are peripherally spaced teeth 9, 10, 11, 12 provided with forward cutting edges 13, 14, 15, 16, respectively, which are located equidistant radially outwardly of the center of the arbor hole 4. The teeth 9, 11 are substantially parallel to, and laterally offset on, opposite sides of the disk 1, as best seen in Fig. 2.

Figure 2:
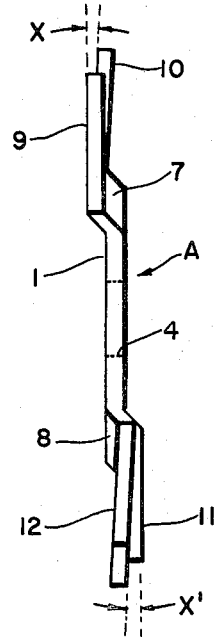
Fig. 2 is a front elevational view of the dado cutter.
Figure 3:
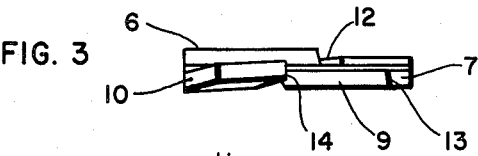
Fig. 3 is a top plan view of the dado cutter.
Figure 4:
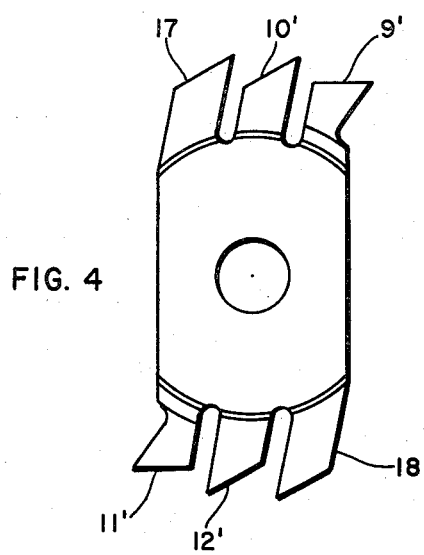
Fig. 4 is a side elevational view of a modified form of dado cutter.
Figure 5:
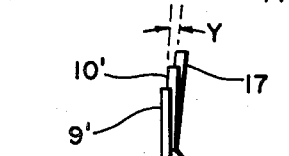
Fig. 5 is a front elevational view of the dado cutter of Fig. 4.

The teeth 10, 12 are slightly longer than the teeth 9, 11, and extend outwardly so as to form clearance angles X, X', with the teeth 9, 11, as shown in Fig. 2. Preferably, the angles X, X' are about 5° to 10°. In this connection, it should be noted that the teeth 9, 10, 11, 12 are not "set" as in the case of saw blade teeth, but are merely bent into planes which will form the angles X, X'.

In use, the dado cutter A is mounted on the arbor of any conventional electric handsaw (not shown) and the saw is moved along the work in the usual manner so that the rotating teeth 9, 10, 11, 12 generate the groove or rabbet. The teeth 9, 11 cut a portion of the width and depth of the groove while the teeth 10, 12 which are longer than, and at a slight angle to, the teeth 9, 11 cut the balance of the groove. In this manner, the cutting impact is not limited to the teeth 9, 11 but is, in part, distributed to the teeth 10, 12. The cutter A being one-piece will not become jammed as would a multiple-piece dado cutter and, therefore, permits its safe operation with a power handsaw. Furthermore, since the clearance angles X, X' are very small, successive sharpening of the cutting edges 13, 14, 15, 16 will not alter the width of groove throughout the useful life of the cutter A.

It is also possible to provide a modified form of dado cutter A' which is similar to the dado cutter A and includes teeth 9', 10', 11', 12' resembling the teeth 9, 10, 11, 12 previously described. However, additional teeth 17, 18 are provided which extend at angles y, y' to the teeth 10', 12', the angles y, y' also preferably being of the order of 5° to 10°. The cutter A' is used in the same manner as the cutter A, but is particularly useful for cutting relatively wide grooves or rabbets.

It should be understood that changes and modifications in the form, construction, arrangement, and combination of the several parts of the dado cutter may be made and substituted for those herein shown and described without departing from the nature and principle of my invention.

Having thus described my invention, what I claim and desire to secure by Letters Patent is:

1. A dado cutter comprising an elongated strip-like member having a centrally located arbor hole and parallel longitudinal margins, said longitudinal margins being joined by transversely extending arcuate shoulders concentric with the arbor hole, and a plurality of radial teeth formed integrally with the strip-like member and extending outwardly therefrom in laterally offset relation to the strip-like member, at least two of said teeth being parallel to the plane of the strip-like member and at least two of said teeth forming a small angle with the plane of said strip-like member.

2. A dado cutter comprising an elongated strip-like member having a centrally located arbor hole and parallel longitudinal margins, said longitudinal margins being joined by transversely extending arcuate margins each having arcuate offset flanges thereon, said flanges being concentric with the arbor hole, and a plurality of radial teeth formed on the outer margins of said flanges and extending outwardly therefrom in laterally offset relation to the strip-like member, some of said teeth extending at a small angle to the plane of said strip-like member and some of said teeth being parallel to the plane of the strip-like member.

3. A dado cutter comprising an elongated strip-like member having a centrally located arbor hole and parallel longitudinal margins, said longitudinal margins being joined by transversely extending arcuate margins each having arcuate offset flanges thereon, said flanges being concentric with the arbor hole, and a plurality of radial teeth formed on the outer margins of said flanges and extending outwardly therefrom in laterally offset relation to the strip-like member, at least two of said teeth being parallel to the plane of the strip-like member and at least two of said teeth forming a small angle with the plane of said strip-like member.

4. A dado cutter comprising an elongated strip-like member having a centrally located arbor hole and parallel longitudinal margins, said longitudinal margins being joined by transversely extending arcuate margins each having arcuate offset flanges thereon, said flanges being concentric with the arbor hole, and a plurality of radial teeth formed on the outer margins of said flanges and extending outwardly therefrom in laterally offset relation to the strip-like member, at least two of said teeth being parallel to the plane of the strip-like member and at least two of said teeth forming an angle of from 5° to 10° with the plane of said strip-like member.

5. A dado cutter comprising a flat disk having opposed arcuate margins, a first pair of opposed teeth extending outwardly from said margins and being offset from said disk, said first pair of teeth being parallel, a second pair of teeth extending outwardly from said margins in laterally offset relation to said disk and being at a small angle to said disk, and means for mounting said disk on a saw arbor.

6. A dado cutter comprising a flat disk having opposed arcuate margins provided with opposed offset flanges, a first pair of opposed teeth extending outwardly from the outer margins of said flanges and being substantially parallel to said disk, a second pair of opposed teeth extending outwardly from the outer margins of said flanges, said second pair of teeth being substantially parallel to each other and each being at a small angle to said disk, and means for mounting said disk on a saw arbor.

7. A dado cutter comprising a flat disk having opposed arcuate margins provided with opposed offset flanges, a first pair of opposed teeth extending outwardly from the outer margins of said flanges and being substantially parallel to said disk, a second pair of opposed teeth extending outwardly from the outer margins of said flanges, said second pair of teeth being substantially parallel to each other and each being at an angle of from 5° to 10° to said disk, and means for mounting said disk on a saw arbor.

8. A dado cutter comprising a flat disk having opposed arcuate margins provided with opposed offset flanges, a first pair of opposed teeth extending outwardly from the outer margins of said flanges and being substantially parallel to said disk, a second pair of opposed teeth extending outwardly from the outer margins of said flanges, said second pair of teeth being substantially parallel to each other and each being at a small angle to said disk, said second pair of teeth, furthermore, being longer than said first pair of teeth, and means for mounting said disk on a saw arbor.

9. A dado cutter comprising a flat disk having opposed arcuate margins provided with opposed offset flanges, a first pair of opposed teeth extending outwardly from the outer margins of said flanges and being substantially parallel to said disk, a second pair of opposed teeth extending outwardly from the outer margins of said flanges, said second pair of teeth being substantially parallel to each other and each being at an angle of from 5° to 10° to said disk, said second pair of teeth, furthermore, being longer than said first pair of teeth, and means for mounting said disk on a saw arbor.

10. A dado cutter comprising a flat disk having opposed arcuate margins provided with opposed offset flanges, a first pair of opposed teeth extending outwardly from the outer margins of said flanges and being substantially parallel to said disk, a second pair of opposed teeth extending outwardly from the outer margins of said flanges, said second pair of teeth being substantially parallel to each other and each being at a small angle to said disk, and a third pair of opposed teeth extending outwardly from the outer margins of said flanges, said third pair of teeth being substantially parallel to each other and each being at a small angle to said second pair of teeth.

11. A dado cutter comprising an elongated strip-like member having a centrally located arbor hole and longitudinal margins, said longitudinal margins being joined by transversely extending arcuate margins, and a plurality of radial teeth formed on said outer margins and extending outwardly therefrom in laterally offset relation to the strip-like member, at least two of said teeth being substantially parallel to the plane of said strip-like member and at least two of said teeth forming a small angle with the plane of said strip-like member.

12. A dado cutter comprising an elongated strip-like member having a centrally located arbor hole and longitudinal margins, said longitudinal margins being joined by transversely extending arcuate margins, and a plurality of radial teeth formed on said outer margins and extending outwardly therefrom in laterally offset relation to the strip-like member, at least two of said teeth being substantially parallel to the plane of said strip-like member and at least two of said teeth forming an angle of from 5° to 10° with the plane of said strip-like member.

References Cited in the file of this patent

UNITED STATES PATENTS

| 105,261 | Shailer | July 12, 1870 |
| 2,061,237 | Karle | Nov. 17, 1936 |
| 2,412,433 | Taylor | Dec. 10, 1946 |
| 2,795,247 | Topolinski | June 11, 1957 |

FOREIGN PATENTS

| 3,820 | Great Britain | 1874 |
| 5,881 | Great Britain | 1890 |
| 812,721 | Germany | Sept. 3, 1951 |
| 895,518 | Germany | Nov. 2, 1953 |